(12) United States Patent
Kawachi et al.

(10) Patent No.: US 7,942,548 B2
(45) Date of Patent: May 17, 2011

(54) LIGHT-SOURCE LAMP AND PROJECTOR

(75) Inventors: Atsushi Kawachi, Hyogo (JP); Hideaki Emoto, Hyogo (JP); Katsuhiko Toda, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 282 days.

(21) Appl. No.: 12/161,167

(22) PCT Filed: Jan. 11, 2007

(86) PCT No.: PCT/JP2007/050199
§ 371 (c)(1),
(2), (4) Date: Jul. 16, 2008

(87) PCT Pub. No.: WO2007/083552
PCT Pub. Date: Jul. 26, 2007

(65) Prior Publication Data
US 2010/0149494 A1 Jun. 17, 2010

(30) Foreign Application Priority Data

| Jan. 17, 2006 | (JP) | 2006-009056 |
| Jan. 17, 2006 | (JP) | 2006-009057 |
| Jan. 17, 2006 | (JP) | 2006-009058 |

(51) Int. Cl.
*F21S 4/00* (2006.01)
(52) U.S. Cl. .................. 362/249.02; 362/244
(58) Field of Classification Search .................. 362/227, 362/236, 240, 244, 249.02, 249.11, 294, 362/302, 310, 311.02, 326, 373, 551, 552, 555, 800

See application file for complete search history.

(56) References Cited

U.S. PATENT DOCUMENTS

| 7,148,470 B2* | 12/2006 | Rains et al. .................. 250/228 |
| 7,153,015 B2* | 12/2006 | Brukilacchio ................ 362/555 |
| 2002/0064043 A1 | 5/2002 | Ariga et al. |
| 2005/0201107 A1 | 9/2005 | Seki |

FOREIGN PATENT DOCUMENTS

| JP | 51014573 | 2/1976 |
| JP | 01100304 | 7/1989 |
| JP | 2001-215115 A | 8/2001 |
| JP | 2001216835 A | 8/2001 |
| JP | 2002-170404 A | 6/2002 |

(Continued)

OTHER PUBLICATIONS

PCT/JP2007/050199 International Search Report.

(Continued)

*Primary Examiner* — Hargobind S Sawhney
(74) *Attorney, Agent, or Firm* — Lowe, Hauptman, Ham & Berner, LLP

(57) ABSTRACT

An object is to provide a light-source lamp capable of reducing consumption power while ensuring a certain luminance level and a projector using the light-source lamp. This light-source lamp 1 gathers light from a light source at a lens for emission. The light sources 3, 6 are formed of a plurality of arranged light-emitting diodes 32, 62, and the light sources 3, 6 are driven with pulse-width modulation control of the light-emitting diodes 32, 62. With this, compared with a configuration in which the light sources 3, 6 are subjected to analog control, consumption power of the lamp can be reduced while ensuring a certain luminance level lm.

15 Claims, 15 Drawing Sheets

FOREIGN PATENT DOCUMENTS

| | | |
|---|---|---|
| JP | 2005-017576 A | 1/2005 |
| JP | 2005-024964 A | 1/2005 |
| JP | 2005-148694 A | 6/2005 |
| JP | 2005-156881 A | 6/2005 |
| JP | 2005-158699 A | 6/2005 |
| JP | 2005-257873 A | 9/2005 |

OTHER PUBLICATIONS

Japanese Office Action for application No. 2006-009058, mailed Nov. 9, 2010.

Japanese Office Action for application No. 2006009057, mailed Nov. 9, 2010.

\* cited by examiner

FIG.6

|  | FIRST CONVENTIONAL EXAMPLE (XENON LAMP) | SECOND CONVENTIONAL EXAMPLE (HIGH-PRESSURE MERCURY LAMP) | EXAMPLE OF INVENTION (PWM CONTROL) | COMPARISON EXAMPLE (ANALOG CONTROL) |
|---|---|---|---|---|
| LAMP LIFE [h] | 1500 | 800 | 50000 |  |
| LIGHT-EMISSION EFFICIENCY [lm/w] | 36 | 50 | 65 |  |
| STARTABILITY [min] | INSTANT | 5 TO 6 | INSTANT | INSTANT |

LIGHT-SOURCE LAMP AND PROJECTOR

RELATED APPLICATIONS

The present application is based on International Application PCT/JP2007/050199, filed Jan. 11, 2007, and claims priority from, Japan Application Nos. 2006-009056, 2006-009057 and 2006-009258 all filed Jan. 17, 2006, the disclosures of which are hereby incorporated by reference herein in their entirety.

TECHNICAL FIELD

The present invention relates to light-source lamps and projectors and, more in detail, to a light-source lamp capable of reducing consumption power of a lamp while ensuring a certain luminance level and a projector using the light-source lamp.

BACKGROUND ART

In recent years, light-source lamps using LEDs (light-emitting diodes) have been adopted as light sources for projectors and others. As such a conventional light-source lamp, a technology disclosed in a first patent document is known. The conventional light-source lamp (projector light source) is characterized by including a plurality of light-emitting diodes disposed so as to form a light-source plane with a predetermined size, and lenses provided at the tips of the respective light-emitting diodes so that emission light from these light-emitting diodes are parallel light.

First patent document: Japanese Patent Application Laid-open Publication No. 2005-17576

DISCLOSURE OF INVENTION

An object of the present invention is to provide a light-source lamp capable of reducing consumption power of the lamp while ensuring a certain luminance level and a projector using the light-source lamp.

Means for Solving Problems

According to an aspect of the present invention a light-source lamp gathers light from a light source at a lens for emission. The light-source lamp includes a plurality of light-emitting diodes that forms the light source, and a control unit that drives the light source e by controlling the plurality of light-emitting diodes with pulse-width modulation control.

In the light-source lamp, the main light source is driven with pulse-width modulation control. Therefore, compared with a configuration in which the light source is subjected to analog control, there is an advantage of reducing consumption power of the lump while ensuring a certain luminance level lm. There is also an advantage of reducing heating of the main light source (light-emitting diodes).

Also, in the light-source lamp, the light source may include a main light source and a sub-light source, the sub-light source may be disposed in tandem with and to rearward of the main light source in a direction of emitting light of the main light source, and a light guiding unit may be provided that guides light from the sub-light source toward front of the main light source.

In the present light-source lamp, light of the main light source and light of the sub-light source guided by the light guiding unit toward the front of the main light source are gathered at the lens for emission to the outside. With this, compared with a configuration in which the light source of the lamp includes only the main light source, the luminous intensity of the lamp is advantageously increased. Also, as described above, in the configuration in which the main light source and the sub-light source are subjected to pulse-width modulation control, there is an advantage of allowing optimization for reducing consumption power of the lamp while ensuring a certain luminance level lm. In particular, in the main light source and the sub-light source, since many light-emitting diodes are used, the present invention is beneficial in effectively reducing consumption power.

Furthermore, in the light-source lamp, the light source may include a main light source and a sub-light source, the sub-light source may be disposed in tandem with and to rearward of the main light source in a direction of emitting light of the main light source, and a cooling unit may be provided that cools the main light source and the sub-light source.

In the present light-source lamp, the main light source and the sub-light source are cooled by the cooling unit. Therefore, detrimental effects due to heating when the lamp lights up are advantageously reduced.

Furthermore, in the light-source lamp, the main light source and the sub-light source may be arranged so that a light emitting direction of the main light source and a light emitting direction of the sub-light source are on an approximately same axis and are oriented to an approximately same direction.

In the present light-source lamp, since the main light source and the sub-light source are oriented in the same direction, light loss when light from the sub-light source is directed toward the front of the main light source is small. With this, for example, compared with a configuration in which the main light source and the sub-light source are oriented in opposite directions, there is an advantage of improving light-emission efficiency of the lamp, and also an advantage of simplifying the configuration of the light-guiding unit.

Furthermore, in the light-source lamp, the light guiding unit guides the light from the sub-light source from surroundings of the main light source toward the front of the main light source.

Normally, light emitted from a lamp is converged by a lens to a center portion of the lamp. Therefore, the light emitted from the lamp has a higher luminance level lm as it is closer to the center portion and has a lower luminance level lm as it is closer to its end portions. In this point, in the present light-source lamp, the light from the sub-light source is emitted from the surroundings of the main light source toward the front, thereby advantageously equalizing the luminance levels lm of the lamp among the center portion and the end portions (it is possible to obtain radiation light with a high parallelism). Also, for example, when the light-source lamp is used for a projector, the present configuration is particularly beneficial in equalizing the luminance levels of the entire projected image (center portion and end portions) to render the image easily visible.

Furthermore, in the light-source lamp, the light guiding unit may include a first light guiding unit serving as an incident plane of the light from the sub-light source, and a second light guiding unit having an approximately annular structure surrounding an outer perimeter of the main light source and also guiding light guided by the first light guiding unit toward the front of the main light source.

In the present light-source lamp, since the light guiding unit (second light guiding unit) has an approximately annular structure, light from the sub-light source is emitted from the surroundings of the main light source in an annular shape.

With this, the luminance levels of the lamp are advantageously equalized among the center portion and the end portions.

Furthermore, in the light-source lamp, the cooling unit may include an air-blowing fan and a plurality of air holes formed in a lamp housing that accommodates the main light source and the sub-light source, and with air from the air-blowing fan being supplied through the air holes to the main light source and the sub-light source, the main light source and the sub-light source are cooled.

The present light-source lamp is preferable in cooling the main light source and the sub-light source in a simplified and effective manner.

Furthermore, in the light-source lamp, the main light source and the sub-light source may be adjacently disposed while being separated with a space, and a passage of air from the air-blowing fan may be formed in the space between the main light source and the sub-light source.

In the present light-source lamp, both of the main light source and the sub-light source are simultaneously cooled with air passing through a space between the main light source and the sub-light source. With this, the main light source and the sub-light source are cooled with a single air passage, thereby advantageously simplifying the configuration of the air passage in a lamp housing.

Furthermore, the projector may include the above light-source lamp.

In a projector using the light-source lamp, as described above, the light source of the light-source lamp 1 is driven with PWM control. Therefore, compared with a configuration in which the light source is driven with analog control, consumption power and heating of the lamp are reduced. With this, low power and low heating of the applied product are advantageously improved.

In the light-source lamp according to the present invention, the main light source is driven with pulse-width modulation control. Therefore, compared with a configuration in which the light source is subjected to analog control, there is an advantage of reducing consumption power of the lump while ensuring a certain luminance level lm. There is also an advantage of reducing heating of the main light source (light-emitting diodes).

BRIEF DESCRIPTION OF DRAWINGS

FIG. 6 is a drawing for explaining the operation of the light-source lamp depicted in FIG. 1;

Figure 1:
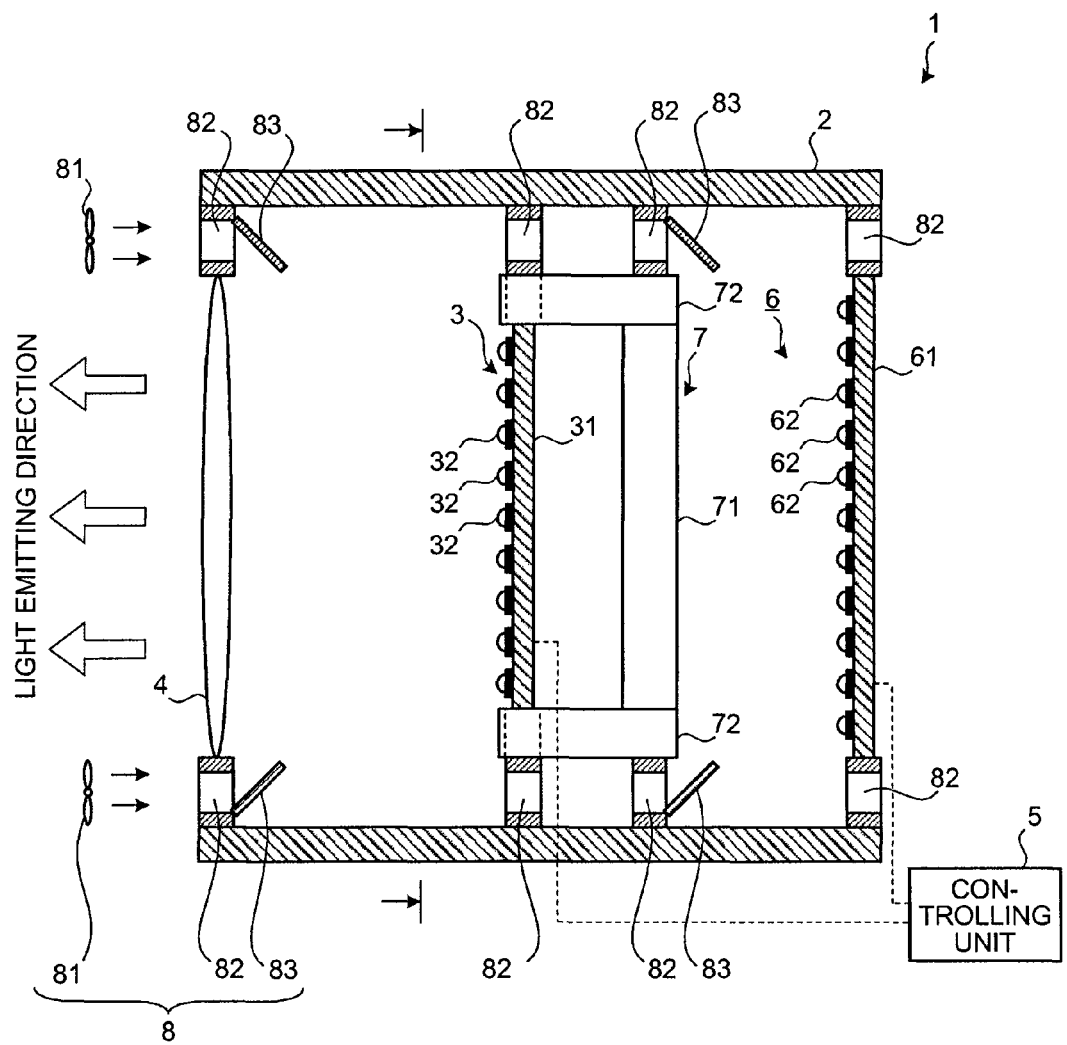
FIG. 1 is a cross-section view of a light-source lamp according to an embodiment of the present invention.

DESCRIPTION OF REFERENCE NUMERALS 1 light-source lamp
2 lamp housing
3 main light source
31 circuit board
32 light-emitting diode
4 lens
5 controlling unit
6 sub-light source
61 circuit board
62 light-emitting diode
7 light guiding unit
71 first light-guiding unit
72 second light-guiding unit
73 optical fiber
8 cooling unit
81 air-blowing fan
82 air hole
83 air-blowing guide

BEST MODE(S) FOR CARRYING OUT THE INVENTION

With reference to the drawings, the present invention is described in detail below. Note that the present invention is not restricted to the following embodiments. Also, components of the embodiment may include those replaceable and facilitated by the person skilled in the art, or substantially similar to each other. Also, a plurality of modification examples described in this embodiment can be arbitrarily combined within a range obvious to the person skilled in the art.

EMBODIMENTS

Figure 2:
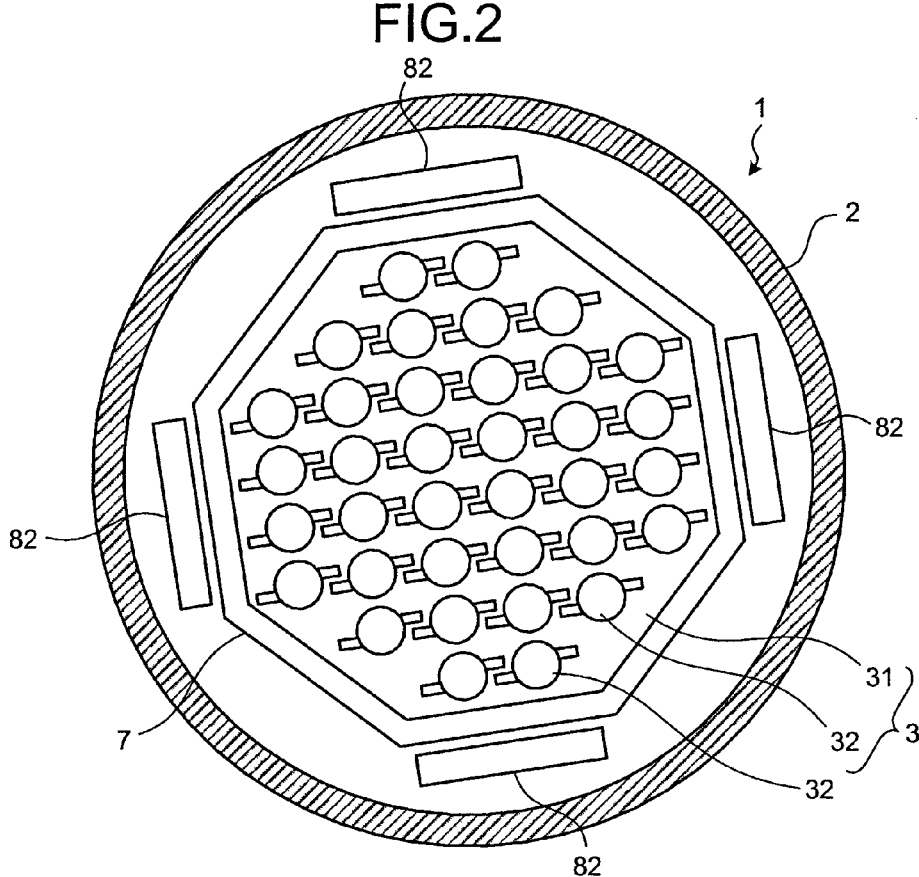
FIG. 2 is a cross-section view of the light-source lamp according to an embodiment of the present invention.
Figure 3:
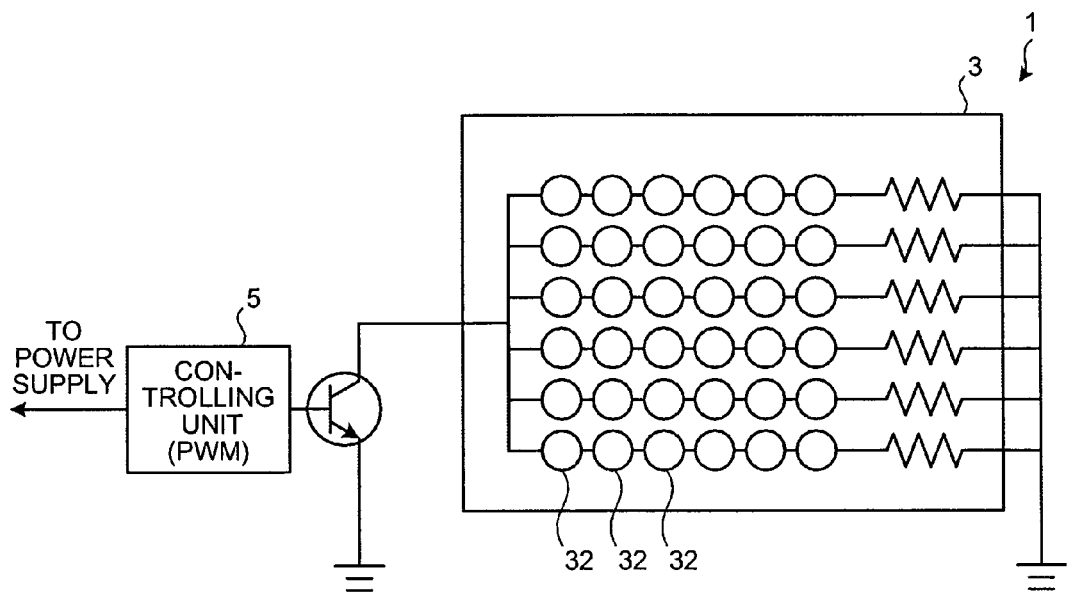
FIG. 3 is a block diagram of the light-source lamp according to an embodiment of the present invention.
Figure 4:
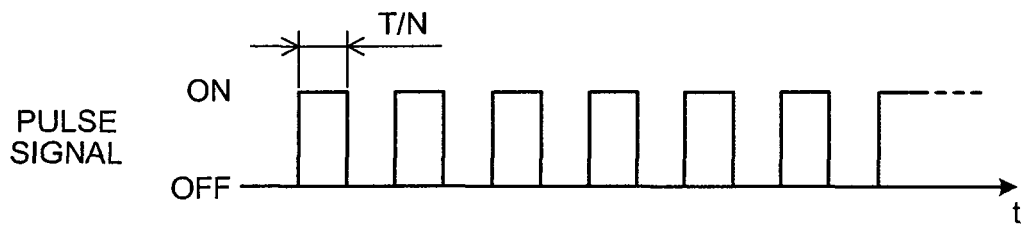
FIG. 4 is a drawing for explaining the operation of the light-source lamp depicted in FIG. 1.
Figure 5:
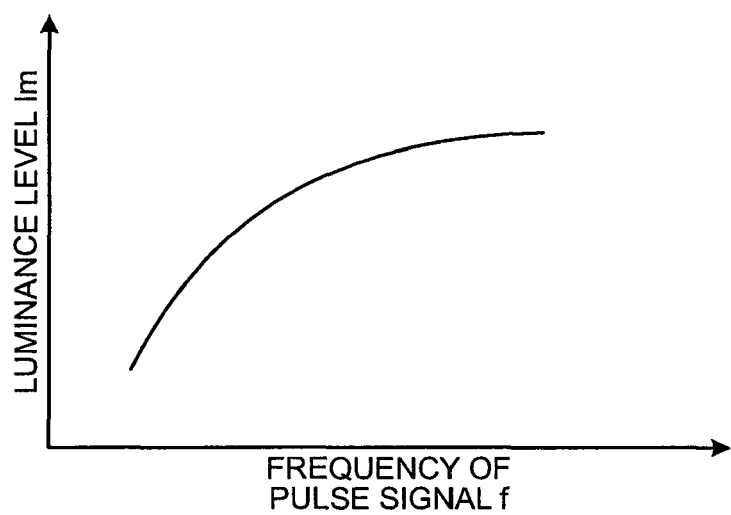
FIG. 5 is a drawing for explaining the operation of the light-source lamp depicted in FIG. 1.
Figure 7:
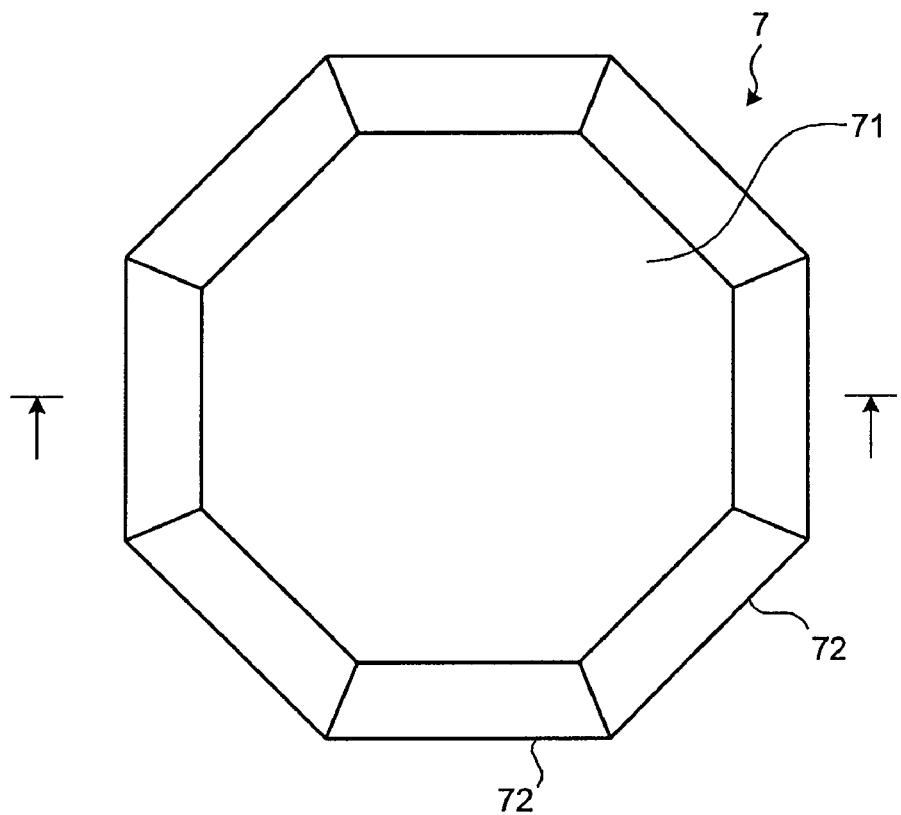
FIG. 7 is a plan view of a light guiding unit of the light-source lamp depicted in FIG. 1.
Figure 8:
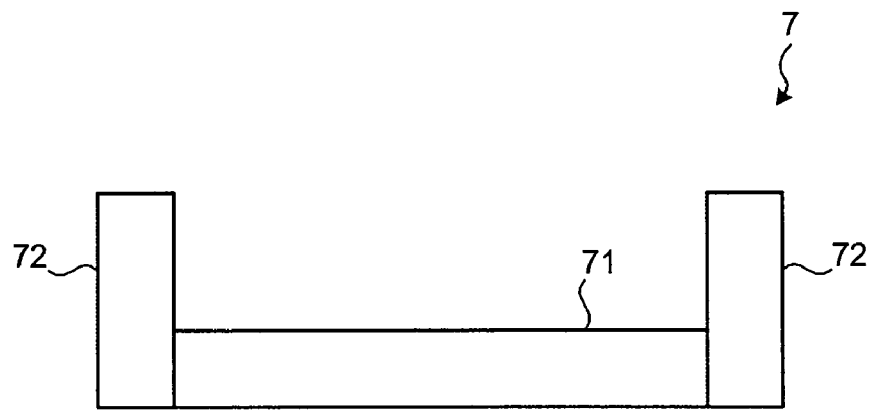
FIG. 8 is a cross-section view of the light guiding unit of the light-source lamp depicted in FIG. 1.
Figure 9:
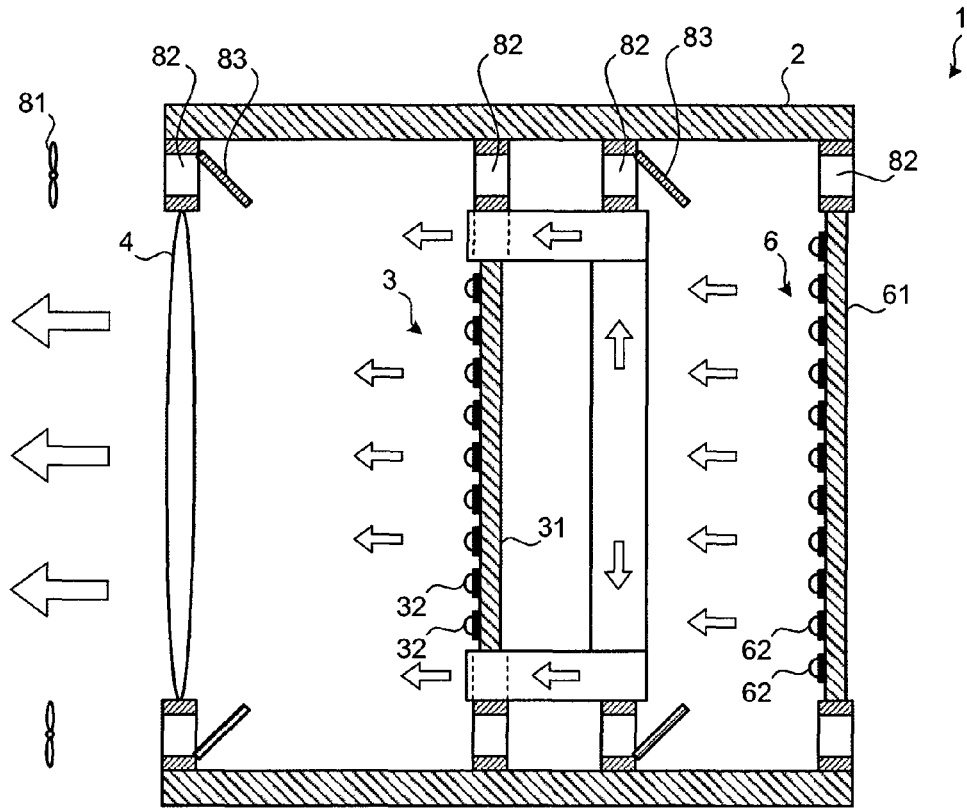
FIG. 9 is a drawing for explaining the operation of the light-source lamp depicted in FIG. 1.
Figure 10:
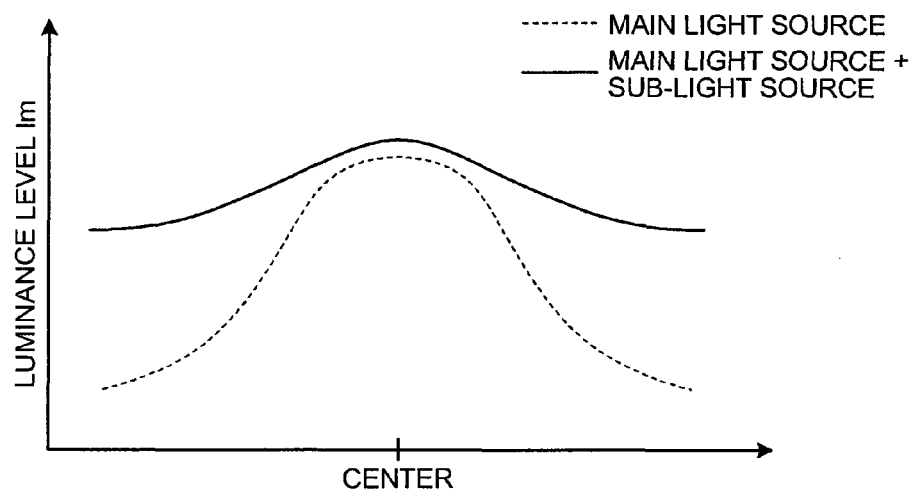
FIG. 10 is a drawing for explaining the operation of the light-source lamp depicted in FIG. 1.
Figure 11:
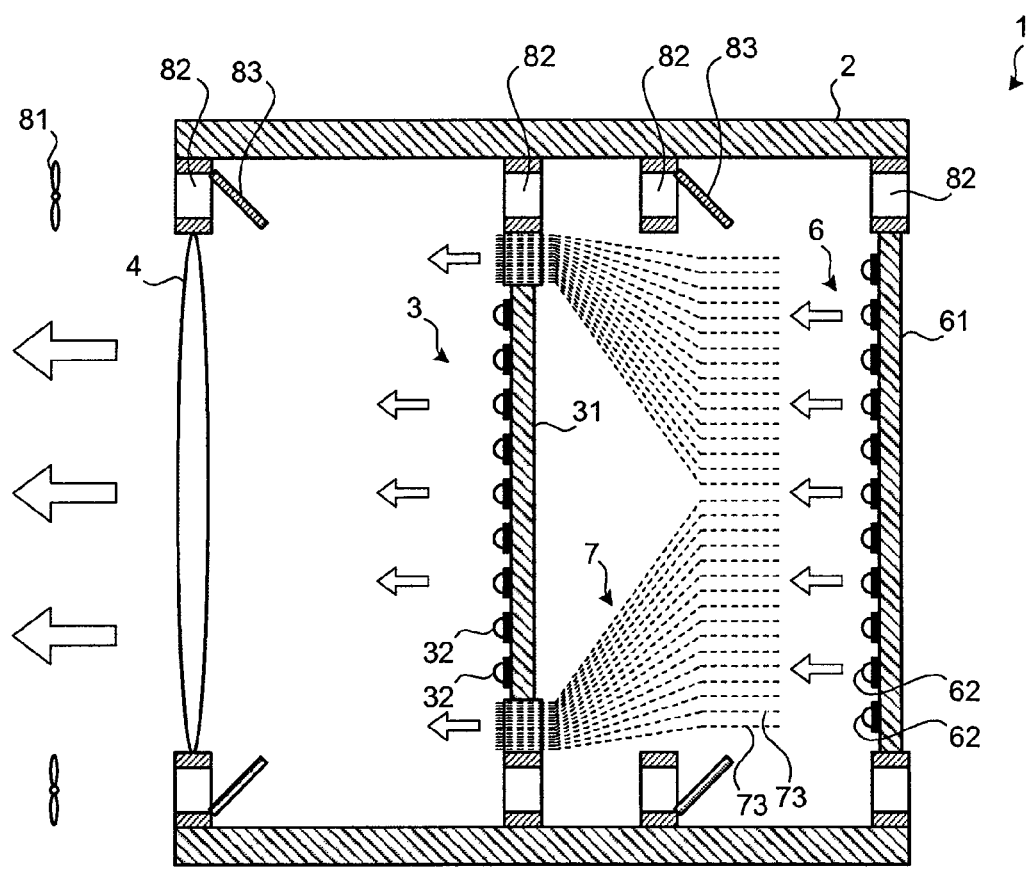
FIG. 11 is a drawing for explaining a modification example of the light-source lamp depicted in FIG. 1.
Figure 12:
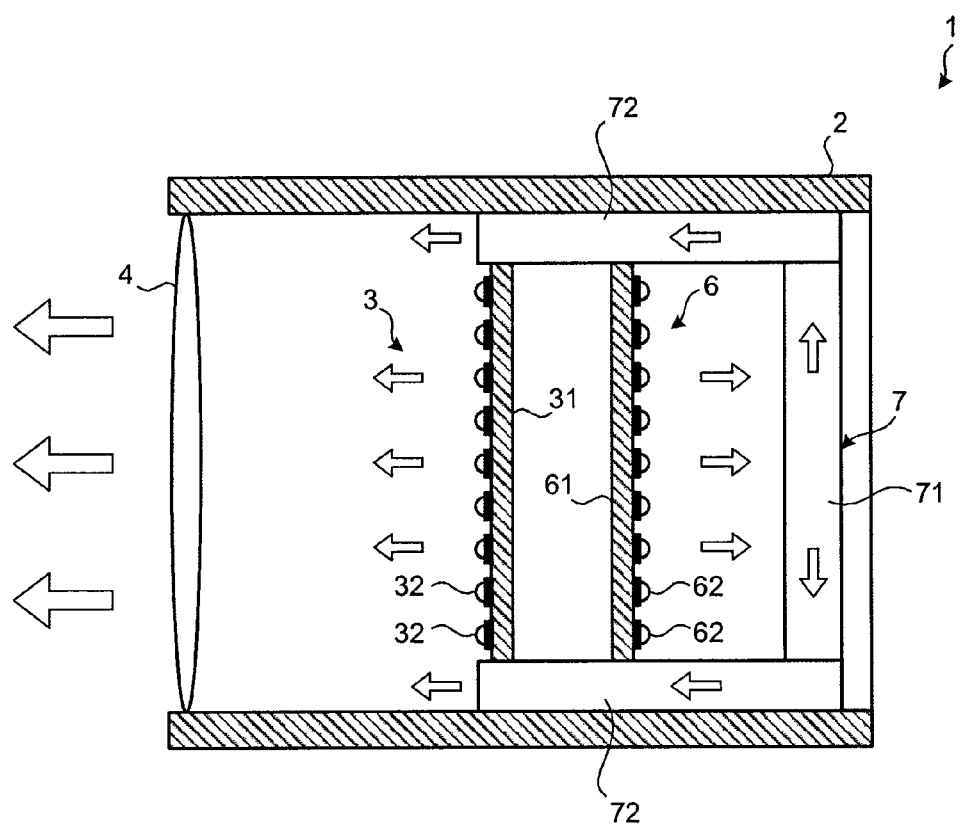
FIG. 12 is a drawing for explaining a modification example of the light-source lamp depicted in FIG. 1.
Figure 13:
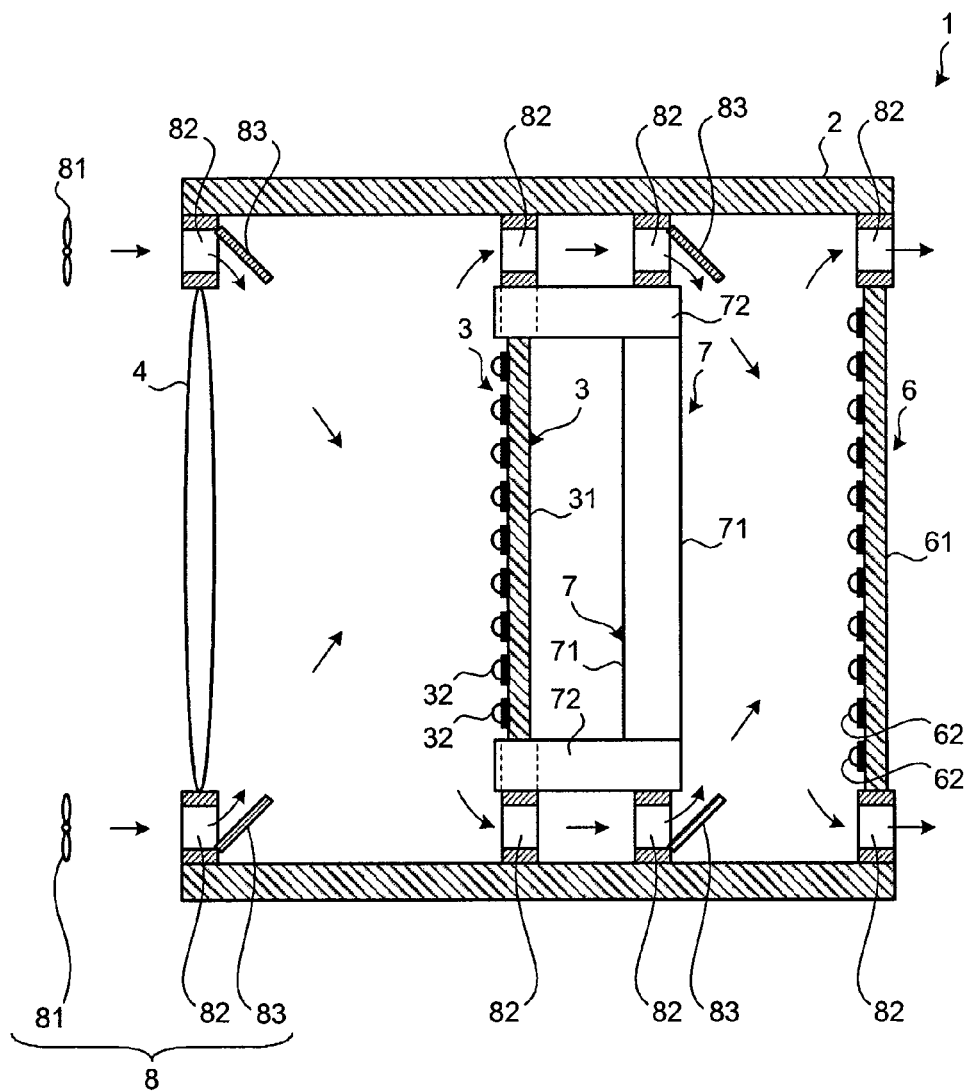
FIG. 13 is a drawing for explaining the operation of a cooling unit of the light-source lamp depicted in FIG. 1.
Figure 19:
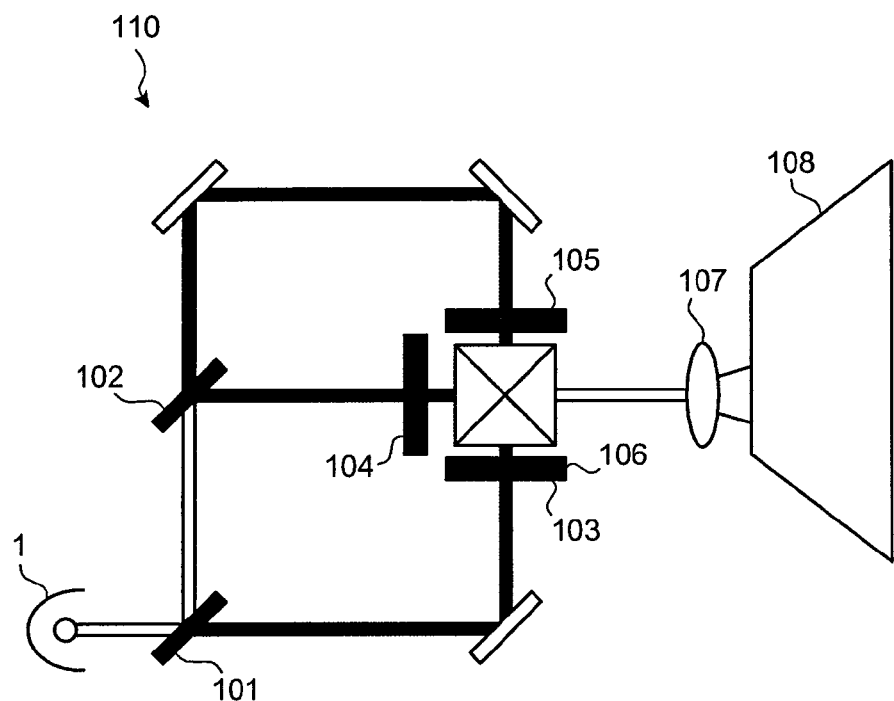
FIG. 19 is a drawing for explaining an application example of the light-source lamp depicted in FIG. 1.
Figure 20:
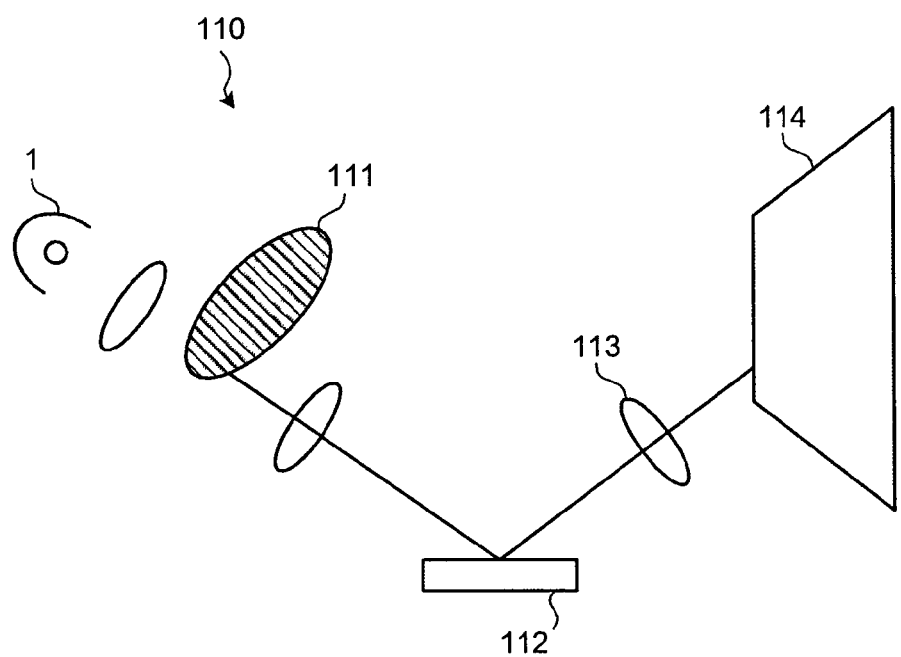
FIG. 20 is a drawing for explaining an application example of the light-source lamp depicted in FIG. 1.

FIGS. 1 to 3 are cross-section views (FIGS. 1 and 2) and a block diagram (FIG. 3) of a light-source lamp according to an embodiment of the present invention. FIGS. 4 to 6 are drawings for explaining the operation of the light-source lamp depicted in FIG. 1. FIGS. 7 and 8 are a plan view (FIG. 7) and a cross-section view (FIG. 8) of a light guiding unit of the light-source lamp depicted in FIG. 1. FIGS. 9 and 10 are drawings for explaining the operation of the light-source lamp depicted in FIG. 1. FIGS. 11 and 12 are drawings for explaining modification examples of the light-source lamp depicted in FIG. 1. FIG. 13 is a drawing for explaining the operation of a cooling unit of the light-source lamp depicted in FIG. 1. FIGS. 14 to 18 are drawings for explaining modification examples of a cooling unit of the light-source lamp depicted in FIG. 1. FIGS. 19 and 20 are drawings for explaining application example of the light-source lamp depicted in FIG. 1.

[Light-Source Lamp]

This light-source lamp 1 has a lamp housing 2, a main light source 3, a lens 4, and a controlling unit 5 (refer to FIGS. 1 to 3). The lamp housing 2 is formed of a cylindrical member having inside therein a main light source 3, a lens 4, and a controlling unit 5. The main light source 3 has a plurality of light-emitting diodes 32 and a circuit board 31 of these light-emitting diodes 32, with the light-emitting diodes 32 being arranged in a lattice shape on the circuit board 31. Also, the main light source 3 has an arrangement surface of the light-emitting diodes 32 being fixedly set inside the lamp housing 2 so as to be oriented in an axial direction of the lamp housing 2. Furthermore, in this main light source 3, to increase heat dissipation, the circuit board 31 adopted is made of aluminum or magnesium. The lens 4 is disposed on the front of the main light source 3 (arrangement surface of the light-emitting diodes 32), and has a function of gathering light from the main light source 3. The controlling unit 5 has a function of controlling the driving of the main light source 3, and is connected to an external power supply (not shown). Here, the power supply of the light-source lump 1 is configured of a power supply for home use or a battery for vehicles. In this light-source lamp 1 in operation, the main light source 3 is driven to light up, and the light is gathered via the lens 4 to be emitted toward the front.

In this light-source lamp 1, since the main light source 3 is formed of the light-emitting diodes 32, (1) compared with a configuration in which the light source is formed of a xenon lamp or a ultrahigh pressure mercury lamp, the lamp life, light-emission efficiency, and startability are advantageously improved (refer to FIG. 6). Here, the lamp life and the light-emission efficiency depicted in the table of FIG. 6 represent measurement values at the time of operation at 500 W. Also, (2) since the heat value of the main light source 3 is small, the cooling system of the lamp can be advantageously simplified. For example, while the lamp temperature is approximately 500 degrees Celsius in a xenon lamp in operation, the lamp temperature is decreased to be on the order of approximately 100 degrees Celsius in the light-source lamp 1 under the equivalent output conditions. Furthermore, (3) since consumption power of the main light source 3 is small, the power of the lamp can be advantageously lowered. Still further, safety of the lamp and simplification of the driving circuit can be advantageously achieved. For example, a xenon lamp is driven by a direct-current power supply of approximately 200 V. This light-source lamp 1 can be driven with a direct-current voltage of approximately 10 V under the equivalent output conditions.

[PWM Control]

Here, in this light-source lamp 1, the main light source 3 is driven with pulse-width modulation control (PWM control). Specifically, the controlling unit 5 generates a pulse signal, with which a pulse voltage is applied to the main light source 3 to cause the main light source 3 to light up (refer to FIG. 4). Also, with a duty value T/N of this pulse signal being adjusted, the lighting control of the lamp is performed. Furthermore, a frequency f of the pulse signal is selected based on a saturation value of the luminance level lm of the main light source 3, thereby optimizing the driving frequency of the lamp (refer to FIG. 5).

In such a configuration, the main light source 3 is driven with pulse-width modulation control. Therefore, compared with the configuration in which the light source is subjected to analog control, consumption power of the lamp can be advantageously reduced while ensuring a certain luminance level lm. Also, heating of the main light source 3 (light-emitting diodes 32) is advantageously reduced.

[Light Guiding Unit]

In general, a light source formed of light-emitting diodes has a low luminous intensity compared with a xenon lamp or the like. For this reason, in the conventional light-source lamp adopting a light source formed of light-emitting diodes (refer to the first patent document), to ensure a sufficient luminous intensity, many light-emitting diodes have to be arranged on a flat surface. This increases the size of the lamp in a width direction, thereby posing a problem that the lamp cannot be applied to an existing projector or head lamp for vehicles.

In view of the above point, in the present light-source lamp 1, the following configuration is adopted (refer to FIG. 1). First, in addition to the main light source 3, a sub-light source 6 is disposed. As with the main light source 3, the sub-light source 6 is formed with a plurality of light-emitting diodes 62 arranged in a lattice shape on a circuit board 61 made of aluminum or magnesium. Also, the sub-light source 6 is disposed in tandem with and to rearward of the main light source 3 in a light emitting direction. Furthermore, the sub-light source 6 is disposed so that its arrangement surface of the light-emitting diodes 62 and the arrangement surface of the light-emitting diodes 32 of the main light source are approximately parallel to each other. Here, the sub-light source 6 is driven with pulse-width modulation control by the controlling unit 5.

Also, in the lamp housing 2, a light guiding unit 7 is disposed (refer to FIGS. 1, 7, and 8). This light guiding unit 7 has a function of guiding the light from the sub-light source 6 toward the front of the main light source 3. The light guiding unit 7 is configured by, for example, combining a plurality of light guiding units (a first guiding unit 71 and a second guiding unit 72) made of acrylic resin. Also, the light guiding unit 7 is disposed so as to be interposed between the main light source 3 and the sub-light source 6. Furthermore, the light guiding unit 7 is disposed so that a flat surface of the first light guiding unit 71 is positioned in front of the sub-light source 6 (on a side of the arrangement surface of the light-emitting diodes 62) and the second light guiding unit 72 faces the front from surrounding of the first light guiding unit 71. Here, to reduce light leakage and cause the light to be irregularly reflected, some portions of the light guiding unit 7 have been grained or have been subjected to vapor deposition of a reflected film, as required.

In this configuration, the light of the main light source 3 and the light of the sub-light source 6 guided by the light guiding unit 7 toward the front of the main light source 3 are gathered at the lens 4 for emission to the outside (refer to FIG. 9). Specifically, the light from the sub-light source 6 enters the light guiding unit 7 from the bottom surface of the first light guiding unit 71, is irregularly reflected in a radial manner in the first light guiding unit 71 to be guided to the surrounding second light guiding unit 72, and then passes through the inside of the second light guiding unit 72 to be emitted from its front end toward the front of the main light source 3. With this, compared with the configuration in which the light source of the lamp includes only the main light source 3, the luminous intensity of the lamp is advantageously increased. Also, in this configuration, the main light source 3 and the sub-light source 6 are disposed in tandem with each other (refer to FIGS. 1 and 7), compared with a configuration in which the light source of the lamp includes many light-emitting diodes disposed on a single flat surface, the lamp is advantageously downsized in a width direction.

Also, as explained above, in the configuration in which the main light source 3 and the sub-light source 6 are subjected to pulse-width modulation control, it is advantageously possible to achieve optimization for reducing consumption power of the lamp, while ensuring a certain luminance level lm. In particular, in the main light source 3 and the sub-light source 6, since many light-emitting diodes 32 and 62 are used, there is an advantage of efficiently reducing consumption power.

First Modification Example of the Light Guiding Unit

Here, in this light-source lamp 1, the light guiding unit 7 preferably has a configuration of guiding the light from the sub-light source 6 from the surroundings of the main light source 3 toward the front of the main light source 3 (refer to FIG. 9). Normally, light emitted from a lamp is converged by the lens 4 to a center portion of a lamp. Therefore, the light emitted from the lamp has a higher luminance level lm as it is closer to the center portion, whilst the light has a lower luminance level lm as it is closer to end portions (refer to FIG. 10). In this point, in the configuration explained above, the light from the sub-light source 6 is emitted from the surroundings of the main light source 3 toward the front, thereby advantageously equalizing the luminance levels lm of the lamp among the center portion and the end portions (it is possible to obtain radiation light with a high parallelism). Also, for example, when the light-source lamp 1 is used for a projector, the present configuration is particularly beneficial in equalizing the luminance levels of the entire projected image (center portion and end portions) to render the image easily visible.

Furthermore, in this configuration, the light guiding unit 7 preferably has the first light guiding unit 71 serving as an incident plane of the light from the sub-light source 6 and the second light guiding unit 72 having an approximately annular structure surrounding the outer perimeter of the main light source 3 and also guiding the light guided by the first light guiding unit 71 toward the front of the main light source 3 (refer to FIGS. 7 to 9). In this configuration, since the light guiding unit 7 has an approximately annular structure (the second light guiding unit 72), the light from the sub-light source 6 is emitted in an annular shape from the surrounding of the main light source 3. With this, the luminance levels of the lamp can be advantageously equalized with a simple configuration among the center portion and the end portions (refer to FIG. 10).

Still further, in the configuration explained above, the second light guiding unit 72 of the light guiding unit 7 is preferably formed of a plurality of light guiding plates combined in an approximately annular shape (refer to FIGS. 7 and 8). For example, the light guiding unit 7 is formed of a first light guiding unit 71 having an octagonal flat plate shape and eight light guiding plates each having a trapezoidal cross-section. The second light guiding unit 72 is disposed to be combined in an annular shape so as to surround the outer perimeter of the first light guiding unit 71. In this configuration, compared with the configuration in which the light guiding unit 7 is formed of a single member, there is an advantage of easily processing the light guiding unit 7.

However, this is not meant to be restrictive, and the second light guiding unit 72 of the light guiding unit 7 is preferably formed of a single light guiding member having an approximately annular shape (not shown). In this configuration, the main light source 3 is disposed inside of the annular shape of the second light guiding unit 72, and the light of the sub-light source 6 is emitted from the surroundings of the main light source 3 (the annular-shaped second light guiding unit 72). Thus, with the annular shape of the second light guiding unit 72, the entire emission light of the lamp has a circular shape. With this, fluctuations in light distribution pattern of the lamp are advantageously reduced.

Furthermore, the light guiding unit 7 is not restricted to light guiding plates. For example, the light guiding unit 7 may be configured of optical fibers (refer to FIG. 11). For example, the light guiding unit 73 is configured of a plurality of optical fibers 73 bundled to form an annular shape, one end of each of the optical fibers 73 being disposed on the front of the sub-light source 6 and the other end thereof being disposed so as to face the front from the side of the main light source 3. In this configuration, the light from the sub-light source 6 is guided through each of the optical fibers 73 toward the front of the main light source 3. Also with this configuration, there is an advantage in which the light of the main light source 3 and the light of the sub-light source 6 are emitted in the same direction, thereby sufficiently ensuring the luminous intensity of the lamp. Also, since the optical fibers 73 has flexibility, there is an advantage of easily forming a light guiding path from the sub-light source 6 toward the front of the main light source 3 (simplifying the configuration of the light guiding unit 7).

Second Modification Example of the Light Guiding Unit

Furthermore, in this light-source lamp 1, the main light source 3 and the sub-light source 6 are preferably arranged so that the light emitting direction of the main light source 3 and the light emitting direction of the sub-light source 6 are on an approximately same axis and are oriented to an approximately same direction (refer to FIGS. 1 and 9). In this configuration, since the main light source 3 and the sub-light source 6 are oriented in the same direction, light loss when the light from the sub-light source 6 is guided toward the front of the main light source 3 is small. With this, for example, compared with a configuration in which the main light source 3 and the sub-light source 6 are oriented in opposite directions, light emission efficiency of the lamp is advantageously improved, and also the configuration of the light guiding unit 7 is advantageously simplified.

However, this is not meant to be restrictive, and the main light source 3 and the sub-light source 6 may be disposed so that the light emitting direction of the main light source 3 and the light emitting direction of the sub-light source 6 are on an approximately same axis and are oriented to opposite directions (refer to FIG. 12). In this configuration, the first light guiding unit 71 of the light guiding unit 7 is disposed at the subsequent stages of the main light source 3 and the sub-light source 6. The light from the sub-light source 6 enters the light guiding unit 7 from the first light guiding unit 71, is irregularly reflected in a radial manner in the first light guiding unit 71 to be guided to the surrounding second light guiding unit 72, and then passes through the inside of the second light guiding unit 72 to be emitted from its end toward the front of the main light source 3 (refer to FIG. 9). Therefore, the light from the sub-light source 6 is guided by the light guiding unit 7 to make a U turn, resultantly going toward the front of the main light source 3. Even with this configuration, there is an advantage in which the light of the main light source 3 and the light of the sub-light source 6 are emitted in the same direction, thereby sufficiently ensuring the luminous intensity of the lamp.

Third Modification Example of the Light Guiding Unit

Also in this light-source lamp 1, the light source has a two-step structure formed of the main light source 3 and the sub-light source 6 (refer to FIG. 1). This is not meant to be restrictive, however, and the light source may have a three-step structure formed of the main light source 3 and the sub-light sources 6 (not shown). With this, there is an advantage in which the luminous intensity of the lamp is more suitably ensured. Here, this configuration can be designed as appropriate within a range obvious to the person skilled in the art according to the configuration depicted in FIG. 1.

[Cooling Unit]

In general, high-luminance light-emitting diodes have a property of emitting high heat at the time of light emission. Also, when a lamp with light-emitting diodes as a light source is applied to a projector or a head lamp for vehicles, to ensure a sufficient lamp luminous intensity, many light-emitting diodes are disposed on a board so as to be densely packed in an array shape to configure a light source. For this reason, when the lamp lights up, the light source becomes at a high temperature due to heating of the light-emitting diodes. Then, the light-emitting diodes do not function in a rated state, thereby possibly causing the light source to catch fire.

In view of the above point, this light-source lamp 1 is provided with a cooling unit 8 that cools the main light source 3 and the sub-light source 6 (refer to FIGS. 1, 2, and 13). The cooling unit 8 includes, for example, an air-blowing fan 81 and a plurality of air holes 82 formed in the lamp housing 2. To supply air from the air-blowing fan 81 to the main light source 3 and the sub-light source 6 through the air holes 82, an air passage is formed in the lamp housing 2.

In this configuration, since the main light source 3 and the sub-light source 6 are cooled by the cooling unit 8, detrimental effects due to heating when the lamp lights up are advantageously reduced. Also, the configuration in which the cooling unit 8 includes the air-blowing fan 81 and the air holes 82 (air-cooled configuration) is preferable in effectively cooling the main light source 3 and the sub-light source 6 in a simple manner.

First Modification Example of the Cooling Unit

Here, in this light-source lamp 1, the exit of each air hole 82 is preferably disposed at a position approximately facing the arrangement surface of the light-emitting diodes 32 of the main light source 3 or the arrangement surface of the light-emitting diodes 62 of the sub-light source 6 (refer to FIGS. 1 and 13). For example, the configuration is such that the air holes 82 are formed on the side of the lens 4 or the side of the light guiding unit 7, with the exit of each air hole 82 being oriented toward the arrangement surface side of the main light source 3 or the sub-light source 6. In this configuration, air passing through the air holes 82 is blown approximately perpendicularly to the front surface of the main light source 3 or the sub-light source 6 (arrangement surface of the light-emitting diodes 32, 62). With this, there is an advantage of effectively cooling the main light source 3 and the sub-light source 6.

Figure 14:
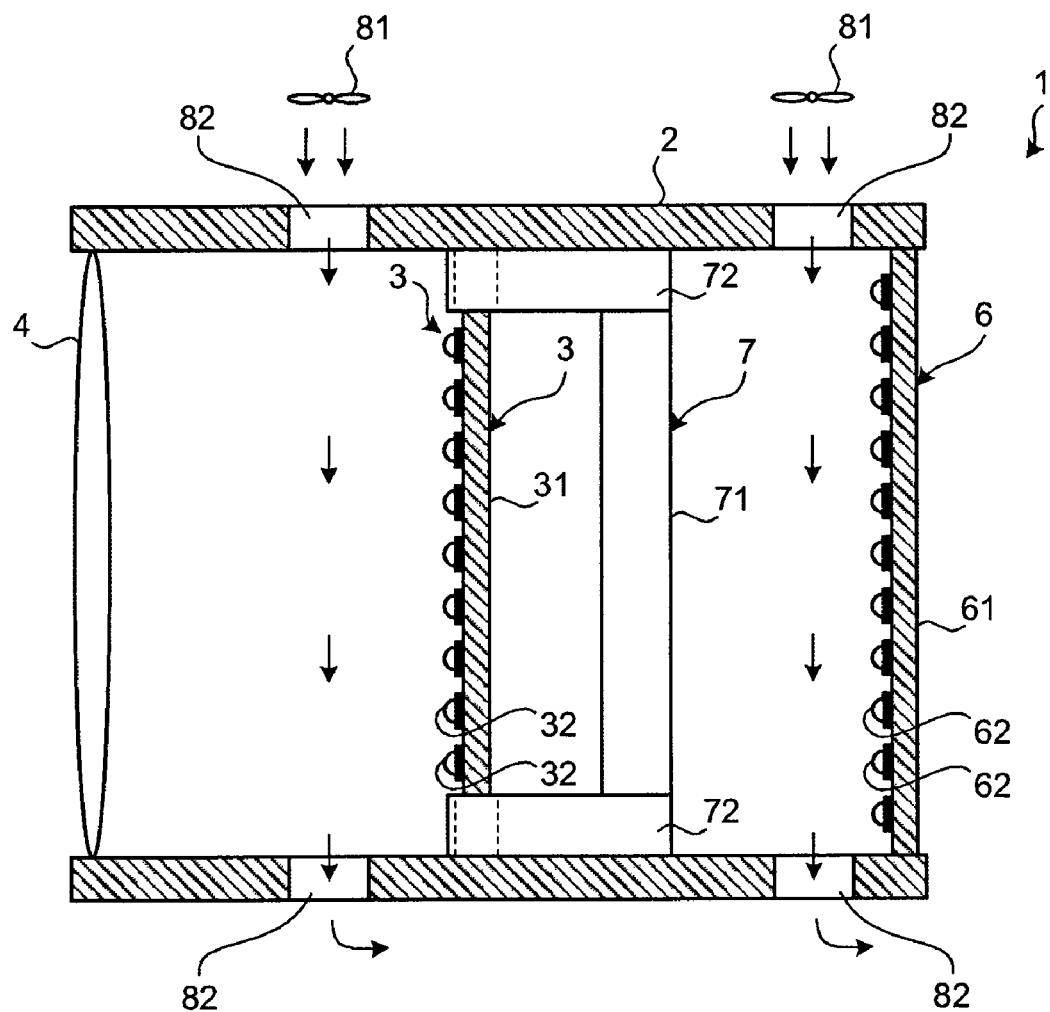
FIG. 14 is a drawing for explaining a modification example of the cooling unit of the light-source lamp depicted in FIG. 1.

However, this is not meant to be restrictive, and the exit of each air hole 82 may be formed on an approximately lateral side of the arrangement surface of the light-emitting diodes 32 of the main light source 3 or the arrangement surface of the light-emitting diodes 62 of the sub-light source 6 (refer to FIG. 14). For example, the air holes 82 are formed on the side surface of the lamp housing 2 (perimeter surface of the cylindrical shape). In this configuration, air passing through the air holes 82 is blown from the side toward the main light source 3 or the sub-light source 6. Then, air passes so as to stroke the front surface of the arrangement surface of the light-emitting diodes 32, 62 from the side, thereby cooling the main light source 3 and the sub-light source 6. With this configuration, compared with the configuration in which the air holes 82 are formed at positions facing the main light source 3 or the sub-light source 6, the outer diameter of the lamp housing 2 can be advantageously downsized by a space of forming the air holes 82 (refer to FIGS. 13 and 14).

Figure 15:
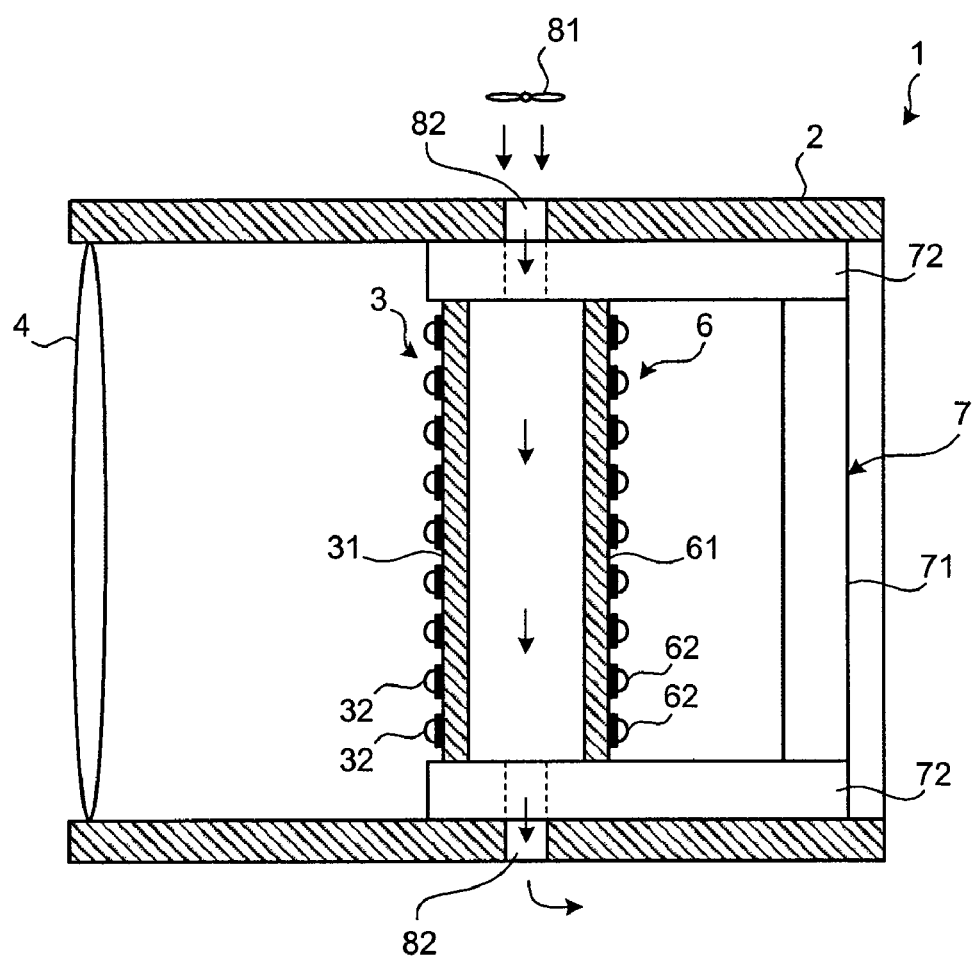
FIG. 15 is a drawing for explaining a modification example of the cooling unit of the light-source lamp depicted in FIG. 1.
Figure 16:
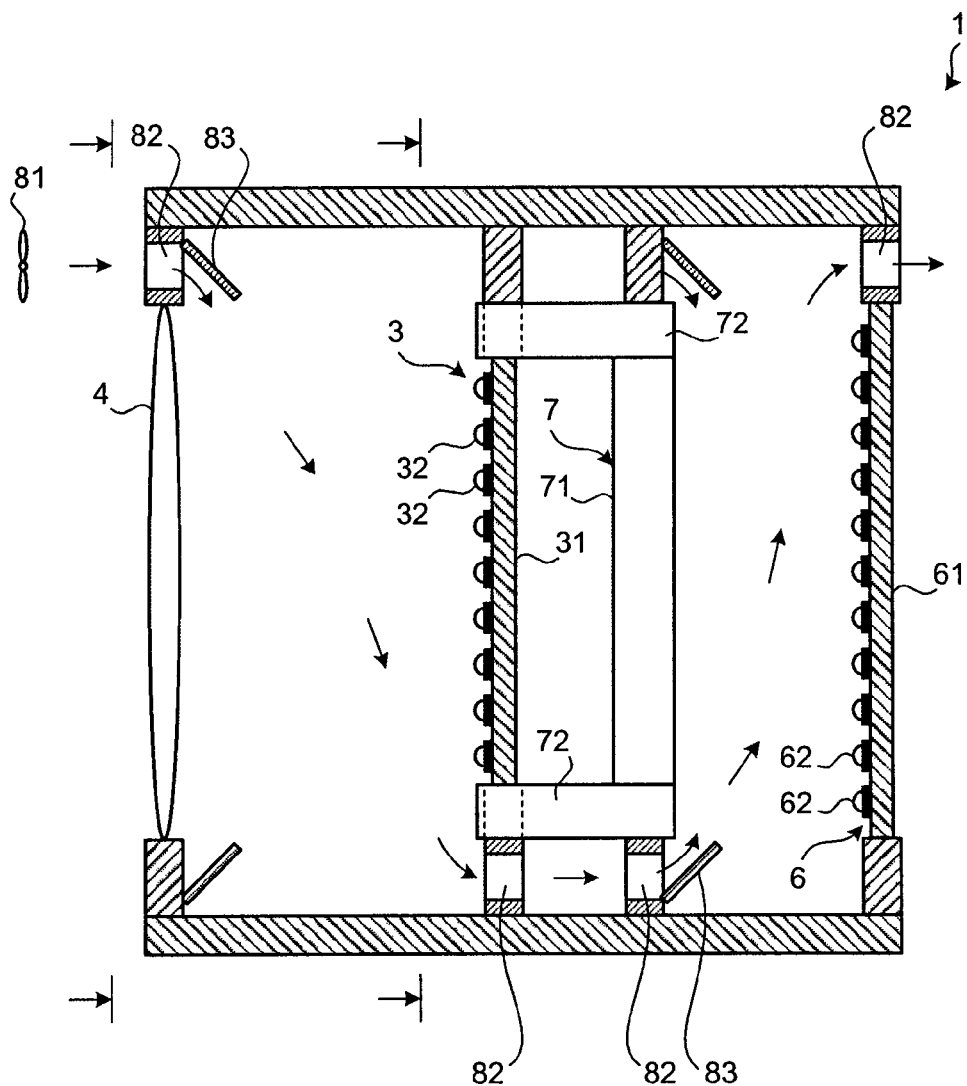
FIG. 16 is a drawing for explaining a modification example of the cooling unit of the light-source lamp depicted in FIG. 1.
Figure 17:
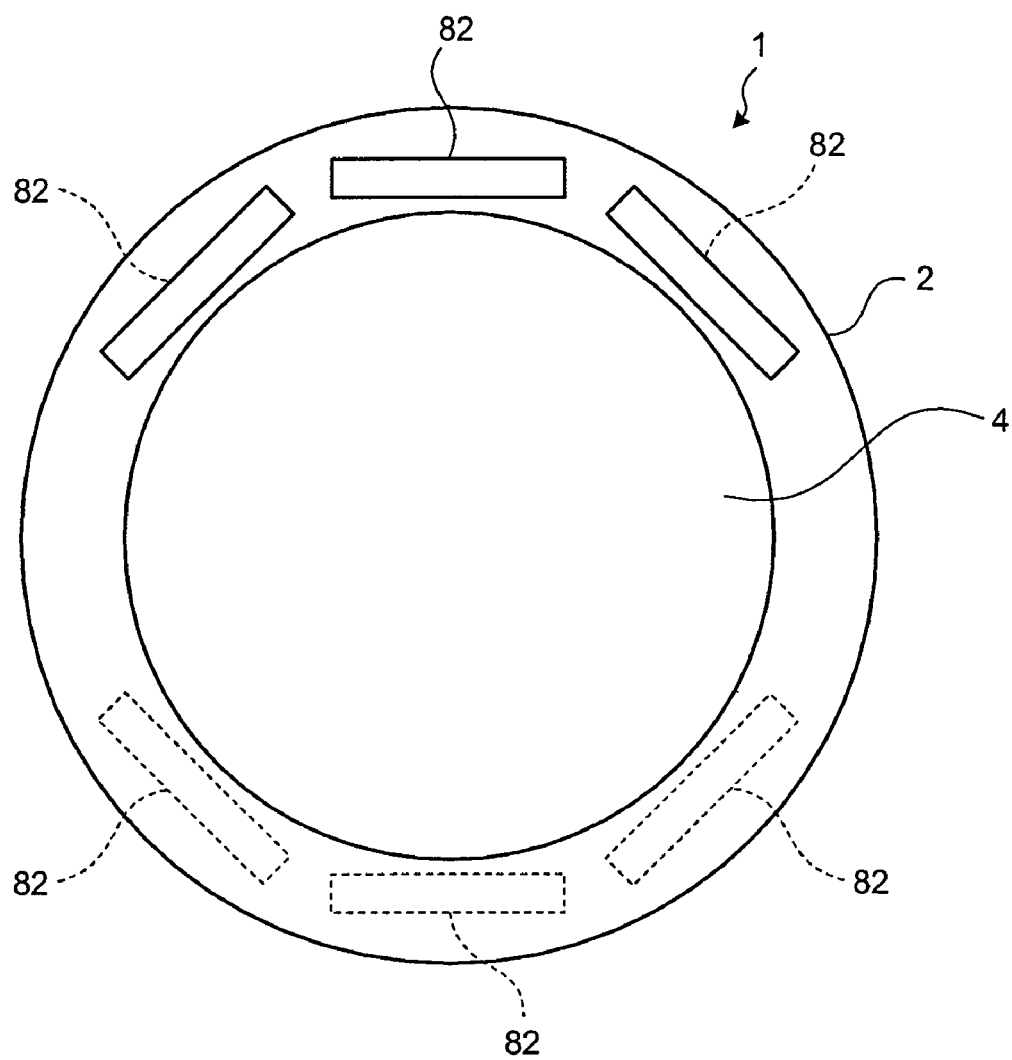
FIG. 17 is a drawing for explaining a modification example of the cooling unit of the light-source lamp depicted in FIG. 1.
Figure 18:
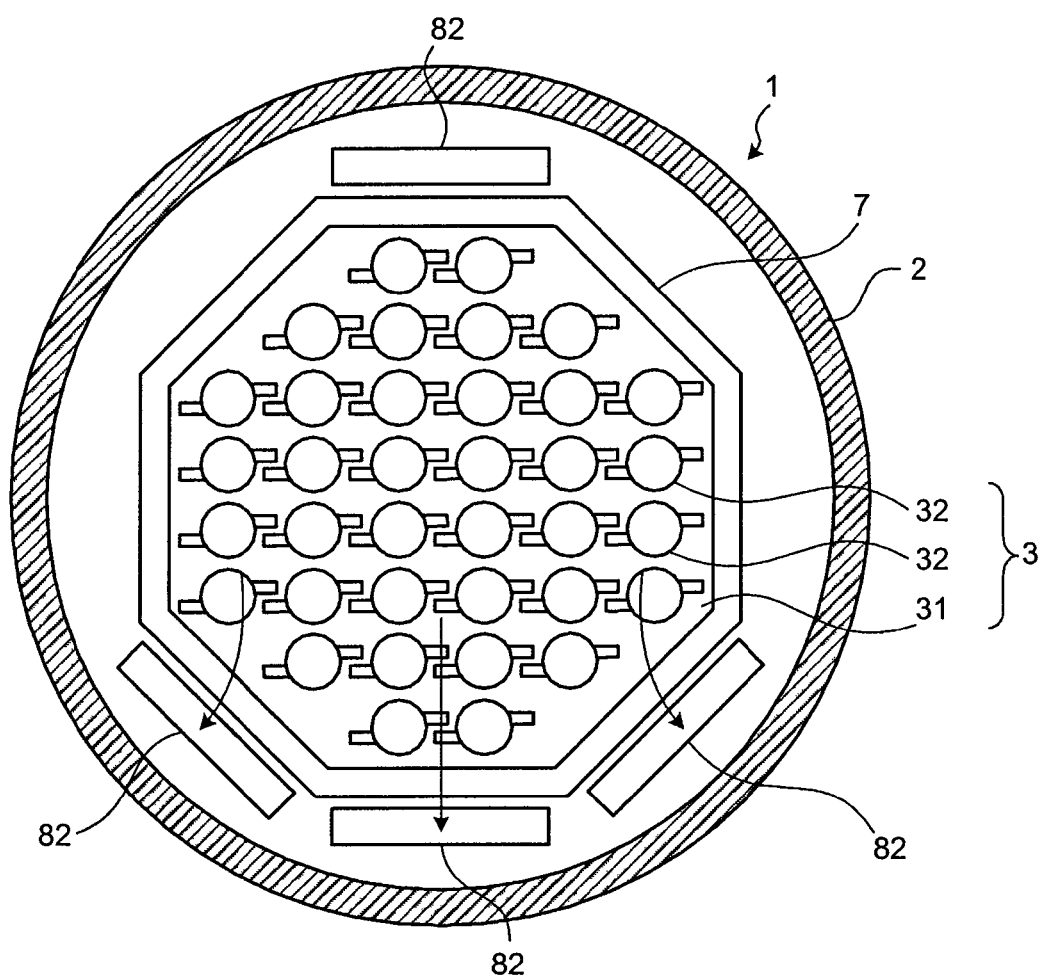
FIG. 18 is a drawing for explaining a modification example of the cooling unit of the light-source lamp depicted in FIG. 1.

Also, in this light-source lamp 1 where the main light source 3 and the sub-light source 6 are adjacently disposed while being separated with a space, a passage of air from the air-blowing fan 81 is preferably formed in the space between the main light source 3 and the sub-light source 6 (refer to FIG. 15). For example, the main light source 3 and the sub-light source 6 are arranged so as to face each other or are disposed in a back-to-back manner, and an air passage is formed so as to let cooled air pass between these main light source 3 and sub-light source 6. In this configuration, with air passing through the space between the main light source 3 and the sub-light source 6, both of the main light source 3 and the sub-light source 6 are simultaneously cooled. Thus, since the main light source 3 and the sub-light source 6 are cooled with the single air passage, the configuration of the air passage in the lamp housing 2 can be advantageously simplified.

Furthermore, in this light-source lamp 1, the air holes 82 are preferably disposed so that the passage of air from the air-blowing fan 81 crosses the surface of the main light source 3 or the sub-light source 6 (refer to FIGS. 14 to 18). For example, the air holes 82 are disposed so that a straight line connecting the exit of each air hole 82 on an upstream side (side from which air is supplied to the main light source 3 or the sub-light source 6) and the exit of each air hole 82 on a downstream side (side from which air after cooling the main light source 3 or the sub-light source 6 is exhausted) crosses the main light source 3 or the sub-light source 6. In this configuration, since cooling air crosses the surface of the main light source 3 or the sub-light source 6, there is an advantage of effectively cooling the main light source 3 and the sub-light source 6.

Here, the configuration is not restricted to the air-cooled configuration described above, but a water-cooled configuration may be adopted for the cooling unit 8 (not shown).

Second Modification Example of the Cooling Unit

Here, in this light-source lamp 1, an air-blowing guide 83 is preferably provided that guides air from the air holes 82 to the surface of the main light source 3 or the sub-light source 6 (refer to FIGS. 1 and 13). For example, the air-blowing guide 83 is formed of a fin-shaped member, and is disposed on a downstream side of the air holes 82 to guide air passing through the air holes 82 to the main light source 3 or the sub-light source 6. In this configuration, since air guided by the air-blowing guide 83 is efficiently blown onto the main light source 3 or the sub-light source 6, there is an advantage of effectively cooling the main light source 3 and the sub-light source 6.

Third Modification Example of the Cooling Unit

Also, in this light-source lamp 1, the light-emitting diodes 32, 62 of the main light source 3 and the sub-light source 6 are preferably arranged on the circuit boards 31, 61 made of aluminum or magnesium (refer to FIG. 1). In this configuration, cooling of the light-emitting diodes 32, 62 are promoted by heat dissipation of the circuit boards 31, 61. With this, there is an advantage of more effectively cooling the main light source 3 and the sub-light source 6.

[First Application Target]

This light-source lamp 1 is preferably applied to, for example, a projector light source. In this projector, as explained above, the light sources 3, 6 of the light-source lamp 1 are driven with PWM control (refer to FIGS. 1 to 5), compared with a configuration in which the light source is driven with analog control, consumption power and heating of the lamp are reduced. With this, low power and low heating of the applied product are advantageously improved. Also, in this light-source lamp 1, the light source is formed of the main light source 3 and the sub-light source 6 disposed in tandem with each other (refer to FIGS. 1 and 9), compared with a configuration formed of many light-emitting diodes disposed on a single flat surface, the lamp can be downsized in a width direction while ensuring the luminous intensity of the lamp at a certain level or higher. With this, downsizing and design of the applied product can be advantageously improved. Furthermore, in this light-source lamp 1, since the light sources 3, 6 are cooled by the cooling unit 8 (refer to FIG. 13), heating of the applied produce in operation is advantageously reduced.

Examples are explained below in which the light-source lamp 1 is applied to a liquid-crystal projector 100 and a DLP (registered trademark) projector 110 (refer to FIGS. 19 and 20).

In the liquid-crystal projector 100 depicted in FIG. 19, white light is first emitted from the light-source lamp 1. This white light is then split at a first dichroic mirror 101 into read light (transmission light), and green light and blue light (reflected light), and is further split by a second dichroic mirror 102 into green light (transmission light) and blue light (reflected light). Next, with these red light, green light, and blue light transmitting liquid-crystal panels 103 to 105, respectively, images of the respective colors (red, green, and blue) are projected. Then, the images of the respective colors are combined at a prism 106, and this combined light is projected via a projection lens 107 onto a screen 108. With this, an image is projected onto the screen 108.

In the DLP projector 110 depicted in FIG. 20, white light is first emitted from the light-source lamp 1. Then, this white light is split at a color wheel 111 into red light, green light, and blue light. Specifically, the color wheel 111 has red, green, and blue, and is rotated at high speed to transmit the white light with filters of the respective colors for split. Then, red light, green light, and blue light transmitting through the color wheel 111 are sequentially reflected by a DMD (Digital Micro mirror Device) 112, and are projected via a projection lens 113 onto a screen 114. With this, an image is projected onto the screen 114.

[Second Application Target]

Also, this light-source projector 1 is preferably used as an illumination lamp placed at a power plant or the like. For example, in a power plant, from the requirement of monitoring its premises, a monitoring lamp is operated successively for a long time. In this point, this light-source lamp 1 is preferable because it is excellent in lamp life and light-emission efficiency (refer to FIG. 6). Also, since a large light amount and space saving are achieved in this light-source lamp 1 by the light sources 3, 6 disposed in tandem with each other, this lamp is preferable because it can output a sufficient light amount required for monitoring and also can be placed in a small space (refer to FIG. 7). Furthermore, since this light-source lamp 1 can cool the light sources 3, 6 with the cooling unit 8, this lamp is preferable in preventing overheating of the lamp at the time of operation successively for a long time (refer to FIG. 13).

[Third Application Target]

Furthermore, this light-source lamp 1 can be applied to a head lamp for vehicle (not shown), for example.

INDUSTRIAL APPLICABILITY

As has been explained in the foregoing, the light-source lamp according to the present invention is useful in being capable of reducing consumption power of the lump while ensuring a certain luminance level.

The invention claimed is:

1. A light-source lamp that gathers light from a light source at a lens for emission, comprising:
   a plurality of light-emitting diodes that forms the light source; and
   a control unit that drives the light source by controlling the plurality of light-emitting diodes with pulse-width modulation control, wherein
   the light-source lamp includes a main light source, a sub-light source, and a light guiding unit, the sub-light source is disposed in tandem with and to rearward of the main light source in a direction of emitting light of the main light source, and the light guiding unit is for guiding light from the sub-light source toward front of the main light source, and
   the light guiding unit includes a first light guiding unit serving as an incident plane of the light from the sub-light source, and a second light guiding unit having an approximately annular structure surrounding an outer perimeter of the main light source for guiding light guided by the first light guiding unit toward the front of the main light source.

2. The light-source lamp according to claim 1, wherein the light source includes a main light source and a sub-light source, the sub-light source is disposed in tandem with and to rearward of the main light source in a direction of emitting light of the main light source, and a cooling unit is provided that cools the main light source and the sub-light source.

3. The light-source lamp according to claim 2, wherein the cooling unit includes an air-blowing fan and a plurality of air holes formed in a lamp housing that accommodates the main light source and the sub-light source, and with air from the air-blowing fan being supplied through the air holes to the main light source and the sub-light source, the main light source and the sub-light source are cooled.

4. The light-source lamp according to claim 1, wherein the main light source and the sub-light source are arranged so that a light emitting direction of the main light source and a light emitting direction of the sub-light source are on an approximately same axis and are oriented to an approximately same direction.

5. The light-source lamp according to claim 1, wherein the light guiding unit guides the light from the sub-light source from surroundings of the main light source toward front of the main light source.

6. The light-source lamp according to claim 1, wherein the main light source and the sub-light source are adjacently disposed while being separated with a space, and a passage of air from the air-blowing fan is formed in the space between the main light source and the sub-light source.

7. A projector comprising the light-source lamp according to claim 1 as a light source.

8. A lamp, comprising:
- a first light source having one or more light-emitting diodes;
- a second light source having one or more light-emitting diodes;
- a control unit coupled to the first light source and the second light source and configured to drive the first light source and the second light source with pulse-width modulation control; and
- a light guiding unit positioned to surround an outer perimeter of the first light source and configured to guide light emitted from the second light source toward a front side of the first light source.

9. The lamp of claim 8, wherein the light guiding unit comprises:
- a first light guiding unit configured to receive and guide light emitted from the second light source; and
- a second light guiding unit having an approximately annular structure surrounding the outer perimeter of the first light source and being configured to guide light guided by the first light guiding unit toward the front side of the first light source.

10. The lamp of claim 8, wherein the second light source is positioned in tandem with and to rearward of the first light source in a direction of emitting light of the first light source.

11. The lamp of claim 8, further comprising a cooling unit configured to cool the first light source and the second source.

12. The lamp of claim 11, wherein the cooling unit includes an air-blowing fan and a plurality of air holes formed in a lamp housing that accommodates the first light source and the second light source, and air from the air-blowing fan is supplied through the air holes to the first light source and the second light source.

13. The lamp of claim 8, wherein the first light source and the second light source are arranged so that a light emitting direction of the first light source and a light emitting direction of the second light source are on an approximately same axis and are oriented to an approximately same direction.

14. The lamp of claim 8, wherein the light guiding unit guides the light emitted from the second light source from surroundings of the first light source toward the front side of the first light source.

15. The lamp of claim 8, wherein the first light source and the second light source are separated by a space, and a passage of air from the air-blowing fan is formed in the space.

\* \* \* \* \*